Patented Mar. 13, 1934

1,950,387

UNITED STATES PATENT OFFICE 1,950,387

SLAG FORMATION AND REDUCTION IN LEAD SOFTENING

Jesse Oatman Betterton and Charles W. Hanson, Omaha, Nebr., assignors to American Smelting & Refining Company, New York, N. Y., a corporation of New Jersey No Drawing. Application January 20, 1932, Serial No. 587,756

2 Claims. (Cl. 75—15)

This invention pertains to the art of metallurgy and relates particularly to the softening of lead. The invention more particularly concerns the formation of slags during the softening process and their subsequent treatment in a reverberatory furnace.

It is well known that lead, as it comes from the smelters, contains various impurities which must be removed if refined lead of a proper quality is to be obtained. In addition, many of these impurities appreciably interfere with desilverization and arsenic, tin and antimony are probably the most troublesome in this respect. For their removal the impure bullion is charged to a softening furnace whereby oxidation these elements form drosses or slags and, with some lead, are skimmed from the bath. Sometimes separate skimmings are made but often no attempt is made to separate them and all are removed together.

After the dross or slag has been skimmed its treatment for removal of values contained therein is a problem that has not been satisfactorily solved by the prior art and with which our invention is concerned. The usual practise is to reduce the dross or slag in a blast furnace for the production of antimonial lead, but although such is the common practise, it is an expensive operation and the results are far from satisfactory, e. g. if it contains much tin, a large amount of lead must be slagged as it is otherwise impossible to control reduction in a blast furnace to keep the tin from entering the antimonial lead.

In an effort to overcome the disadvantages of reducing softener skims in the blast furnace, many attempts have been made to reduce softener skims in a reverberatory furnace by the use of different reagents as fluxes, but the results have been erratic and not commercially successful and blast furnace reduction has, until now, remained as the method usually employed.

However, the disadvantages that accompany the reduction of lead softener skims in a blast furnace, or in a reverberatory furnace as heretofore attempted are now overcome by our invention which permits the practical use of the reverberatory furnace in the reduction of such skims. We have discovered that by the addition of a caustic reagent to the bath during the softening process a slag is obtained which may be economically and satisfactorily reduced in a reverberatory furnace.

Briefly, our invention contemplates adding a caustic reagent such as caustic soda, sodium carbonate, caustic leady slag from the refining process or some other similar compound or mixture, to the bath during the softening process resulting in the formation of a slag and subsequently reducing such slag in a reverberatory furnace. Instead of skimming the oxidized impurities from the softening furnace and adding a flux which results in an unsatisfactory reverberatory action, we have discovered that by going back further in the softening process, that is, to the time of forming the skims, and adding a caustic material to the softening bath at that stage, a successful reverberatory action can be obtained.

Although there is a fairly wide range in the period during the softening process when the caustic addition may be made, we have found that additions made during the final oxidation or blowing out period are the more beneficial. In regard to the amount of caustic material necessary for subsequent successful reverberatory reactions, we have found that a quantity sufficient to give 14% to 25% of $Na_2O$ or its equivalent in the final discard slag after reduction, is desirable.

It is obvious that in operation many adaptations and variations of our invention are possible by those skilled in the art and the following description is not to be interpreted as limiting the broad scope of the invention.

In practise, impure lead may be introduced into an appropriate softening furnace and heated to form a molten bath. A sufficient temperature should be maintained to keep the bath molten during the ensuing oxidation or softening stage and means for agitating the molten bath may be employed if desired to hasten the softening action.

Although the caustic addition may be made at various times during the oxidation of the impurities or, if desired, in several separate additions at desired intervals, we find it accomplishes the results sought if added at or during the final stages of oxidation. If it is the practise to make additions of lead oxide to the bath, the caustic material may be added at the same time. While we have found sodium carbonate, caustic soda or caustic skims from refining processes to be very effective caustic reagents, we have found that many others may be used, either entirely or partially, in place of the three named. Alkali salts such as chlorides and borates, especially those of sodium may be used, but in general they give better results when used in conjunction with such reagents as sodium carbonate or caustic soda.

After making the caustic addition to the bath, and when the oxidation of impurities has sufficiently progressed, the slag may be transferred to a reverberatory furnace and smelted therein. The following is a specific example of the results obtained from a slag formed by our process. Six tons of slag taken from the softening furnace contained:

| | Per cent |
|---|---|
| Antimony | 36.0 |
| Lead | 34.0 |
| Tin | 1.0 |
| Arsenic | 1.2 |
| $Na_2O$ (or equivalent) | 5.0 |

This was charged directly to a reverberatory furnace for reduction, 1200 lbs. of oil coke were added and the following were obtained:

Fume—0.5 tons, containing:

| | Per cent |
|---|---|
| Antimony | 55.0 |
| Arsenic | 3.0 |
| Lead | 15.0 |

Metal—5 tons, containing:

| | Per cent |
|---|---|
| Antimony | 32.8 |
| Arsenic | 1.0 |
| Tin | 0.5 |
| Lead | 64.0 |

Discard slag—1 ton, containing:

| | Per cent |
|---|---|
| Antimony | 5.0 |
| Arsenic | 0.4 |
| Lead | 0.6 |
| Tin | 3.1 |
| $Na_2O$ | 25.0 |
| $SiO_2$ | 25.0 |

A glance at the composition of the discard slag shows how successful the invention is. Although the example given shows a discard slag containing 0.6% lead, we often produce final slags carrying as little at 0.15% to 0.20% lead and only 4% to 5% antimony. These losses are negligible when one considers what a small part the discard slag is of the original charge to the lead softener.

In addition to giving a skim that may be reduced in a reverberatory furnace, our invention secures many other useful and beneficial results. It assists and materially increases the speed of the softening action, but what is equally important, it makes for a selectivity of reaction whereby the total amount of antimony, arsenic and tin entering the skims is materially increased and the total amount of lead entering the skims is decreased. Again the same selectivity of reaction results not only in a larger proportion of the impurities entering the slag but the slags themselves contain a smaller percentage of lead and higher percentages of antimony, arsenic and tin. We have by our invention not uncommonly obtained slags containing as high as 50% of arsenic, antimony and tin and as low as 25% to 30% lead.

While our invention allows reverberatory treatment of all lead softener slags, such treatment of slags containing a high percentage of tin along with antimony is of special interest as already stated. The prior practise has been to completely reduce the softener slag in a blast furnace and this, in the case of a slag with a high tin content, necessitated subsequent elimination of tin. By our invention which allows reduction in a reverberatory furnace, we are able to control reduction and instead of a discard slag, obtain a high tin slag which may be further processed for the recovery of tin, while final antimonal lead is, of course, removed from the reverberatory furnace.

As to the manner in which our invention functions, we believe that, as part of the action, plumbite and/or plumbate of lead are formed which are very active in scorifying antimony, arsenic and tin. We further believe that the use of sodium carbonate in the softening process produces a matrix wherein the oxidized arsenic, antimony and tin are either homogeneously mixed with the $Na_2CO_3$ or actually chemically combined as the corresponding sodium salts—antimonates, stannates and arsenates.

What is claimed is:

1. In the treatment of lead bullion containing a relatively high percentage of tin, the method that comprises establishing a molten bath of such bullion, subjecting said molten bath to oxidizing conditions in the presence of a caustic flux whereby impurities including tin are slagged and softened lead is obtained, transferring the slag to a reverberatory furnace, reducing said slag to form a tin slag and further processing said tin slag for the recovery of tin.

2. The process of treating lead containing considerable quantities of antimony and tin which comprises oxidizing a molten bath of such metal in the presence of an alkali flux thereby concentrating the antimony and tin in a slag containing minor amounts of lead, and thereafter subjecting said slag to a controlled reducing action in a furnace of the reverberatory type thereby recovering the antimony and lead as an antimonial lead alloy and the tin as a rich tin slag which may readily be processed for the recovery of tin.

JESSE OATMAN BETTERTON.
CHARLES W. HANSON.